United States Patent
Thomsen et al.

(10) Patent No.: US 12,410,654 B2
(45) Date of Patent: Sep. 9, 2025

(54) VACUUM INSULATED PANEL WITH PASSIVATION LAYER

(71) Applicant: LuxWall, Inc.

(72) Inventors: Scott V. Thomsen, Glen Arbor, MI (US); Christian Bischoff, Maumee, OH (US); Phil Lingle, Temperance, MI (US)

(73) Assignee: LuxWall, Inc., Ypsilanti, MI (US)

( * ) Notice: Subject to any disclaimer, the term of this patent is extended or adjusted under 35 U.S.C. 154(b) by 0 days.

(21) Appl. No.: 18/513,944

(22) Filed: Nov. 20, 2023

(65) Prior Publication Data

US 2024/0167321 A1    May 23, 2024

Related U.S. Application Data

(60) Provisional application No. 63/540,729, filed on Sep. 27, 2023, provisional application No. 63/427,670, filed on Nov. 23, 2022, provisional application No. 63/427,657, filed on Nov. 23, 2022, provisional application No. 63/427,645, filed on Nov. 23, 2022, provisional application No. 63/427,661, filed on Nov.

(Continued)

(51) Int. Cl.
| | | |
|---|---|---|
| *E06B 3/66* | (2006.01) | |
| *C03C 17/23* | (2006.01) | |
| *C03C 17/36* | (2006.01) | |
| *E06B 3/663* | (2006.01) | |
| *E06B 3/67* | (2006.01) | |

(52) U.S. Cl.
CPC ............ *E06B 3/6612* (2013.01); *C03C 17/23* (2013.01); *C03C 17/366* (2013.01); *E06B 3/66333* (2013.01); *E06B 3/6715* (2013.01); *C03C 2217/213* (2013.01); *E06B 3/66304* (2013.01)

(58) Field of Classification Search
CPC ........ E06B 3/66; E06B 3/6608; E06B 3/6612; E06B 3/6617; E06B 3/663–66371; E06B 3/67; E06B 3/6715; Y02A 30/249; Y02B 80/22; B32B 17/10055
See application file for complete search history.

(56) References Cited

U.S. PATENT DOCUMENTS

| | | |
|---|---|---|
| 3,433,611 A | 3/1969 | Saunders et al. |
| 5,124,185 A | 6/1992 | Kerr et al. |

(Continued)

FOREIGN PATENT DOCUMENTS

| | | | |
|---|---|---|---|
| EP | 1199289 A1 * | 1/2007 | ........... E06B 3/6612 |
| EP | 1 563 952 B1 | 6/2013 | |

OTHER PUBLICATIONS

PCT International Search Report dated Mar. 22, 2024 for PCT/US2023/079984.

(Continued)

*Primary Examiner* — Z. Jim Yang
(74) *Attorney, Agent, or Firm* — Nixon & Vanderhye P.C.

(57) ABSTRACT

A vacuum insulating panel includes first and second substrates (e.g., glass substrates), a hermetic edge seal, a pump-out port, and spacers sandwiched between at least the two substrates. The gap between the substrates may be at a pressure less than atmospheric pressure to provide insulating properties. The vacuum insulating panel may include at least one passivation layer for reducing outgassing from a glass substrate, in order to improve lifespan of the vacuum insulating panel.

28 Claims, 2 Drawing Sheets

Related U.S. Application Data 23, 2022, provisional application No. 63/427,667, filed on Nov. 23, 2022.

(56) References Cited

U.S. PATENT DOCUMENTS

| | | | |
|---|---|---|---|
| 5,657,607 | A | 8/1997 | Collins |
| 5,664,395 | A | 9/1997 | Collins |
| 5,935,702 | A | 8/1999 | Macquart et al. |
| 6,042,934 | A | 3/2000 | Guiselin et al. |
| 6,322,881 | B1 | 11/2001 | Boire et al. |
| 6,352,749 | B1 | 3/2002 | Aggas |
| 6,533,632 | B1 | 3/2003 | Dynka |
| 6,558,494 | B1 | 5/2003 | Wang et al. |
| 6,641,689 | B1 | 11/2003 | Aggas |
| 6,946,171 | B1 | 9/2005 | Aggas |
| 7,045,181 | B2 | 5/2006 | Yoshizawa et al. |
| 7,115,308 | B2 | 10/2006 | Amari et al. |
| 7,314,668 | B2 | 1/2008 | Lingle et al. |
| 7,342,716 | B2 | 3/2008 | Hartig |
| 7,407,423 | B2 | 8/2008 | Aitken et al. |
| 7,425,166 | B2 | 9/2008 | Burt et al. |
| 7,560,402 | B2 | 7/2009 | Thomsen |
| 7,632,571 | B2 | 12/2009 | Hartig et al. |
| 7,858,193 | B2 | 12/2010 | Ihlo et al. |
| 7,910,229 | B2 | 3/2011 | Medwick et al. |
| 7,919,157 | B2 | 4/2011 | Cooper |
| 8,490,434 | B2 | 7/2013 | Watanabe et al. |
| 8,500,933 | B2 | 8/2013 | Cooper |
| 8,590,343 | B2 | 11/2013 | Wang |
| 8,821,999 | B2 | 9/2014 | Grzybowski et al. |
| 8,833,105 | B2 | 9/2014 | Dennis et al. |
| 8,951,617 | B2 | 2/2015 | Reymond et al. |
| 9,169,155 | B2 | 10/2015 | Dennis et al. |
| 9,215,760 | B2 | 12/2015 | Fischer et al. |
| 9,290,984 | B2 | 3/2016 | Hogan et al. |
| 9,388,628 | B2 | 7/2016 | Petrmichl et al. |
| 9,428,952 | B2 | 8/2016 | Dennis et al. |
| 9,441,416 | B2 | 9/2016 | Veerasamy et al. |
| 9,458,052 | B2 | 10/2016 | Dennis |
| 9,593,527 | B2 | 3/2017 | Hogan et al. |
| 9,752,375 | B2 | 9/2017 | Jones |
| 9,776,910 | B2 | 10/2017 | Dennis |
| 9,822,580 | B2 | 11/2017 | Cooper |
| 9,908,811 | B2 | 3/2018 | Gross et al. |
| 10,011,525 | B2 | 7/2018 | Logunov et al. |
| 10,017,417 | B2 | 7/2018 | Dejneka et al. |
| 10,087,676 | B2 | 10/2018 | Dennis |
| 10,107,028 | B2 | 10/2018 | Dennis |
| 10,125,045 | B2 | 11/2018 | Dennis |
| 10,153,389 | B2 | 12/2018 | Godeke et al. |
| 10,267,085 | B2 | 4/2019 | Dennis et al. |
| 10,280,680 | B2 | 5/2019 | Veerasamy et al. |
| 10,421,684 | B2 | 9/2019 | Hogan et al. |
| 10,435,938 | B2 | 10/2019 | Dennis et al. |
| 10,465,433 | B2 | 11/2019 | Hogan et al. |
| 10,731,403 | B2 | 8/2020 | Krisko et al. |
| 10,752,535 | B2 | 8/2020 | Dennis |
| 10,759,693 | B2 | 9/2020 | Xu et al. |
| 10,829,984 | B2 | 11/2020 | Dennis et al. |
| 10,858,880 | B2 | 12/2020 | Dennis |
| 10,954,160 | B2 | 3/2021 | Streltsov et al. |
| 11,014,847 | B2 | 5/2021 | Dennis |
| 11,028,009 | B2 | 6/2021 | Dennis |
| 11,028,637 | B2 | 6/2021 | Abe et al. |
| 11,124,450 | B2 | 9/2021 | Miki et al. |
| 11,285,703 | B2 | 3/2022 | Jorgensen et al. |
| 2009/0155555 | A1 | 6/2009 | Botelho et al. |
| 2011/0296771 | A1* | 12/2011 | Miller ............ B32B 37/1284 52/204.593 |
| 2012/0131959 | A1 | 5/2012 | No et al. |
| 2012/0202049 | A1 | 8/2012 | Valladeau et al. |
| 2013/0101759 | A1 | 4/2013 | Jones |
| 2014/0154434 | A1* | 6/2014 | Nunez-Regueiro ............ C03C 17/3626 428/428 |
| 2015/0218032 | A1* | 8/2015 | Hogan ............ C03C 8/02 65/33.2 |
| 2016/0297706 | A1 | 10/2016 | Naito et al. |
| 2017/0114588 | A1 | 4/2017 | Fukuda et al. |
| 2017/0253524 | A1* | 9/2017 | Weidner ............ C03C 17/3417 |
| 2018/0238104 | A1 | 8/2018 | Mikkelsen et al. |
| 2018/0244571 | A1* | 8/2018 | Uriu ............ C03C 27/10 |
| 2019/0036480 | A1* | 1/2019 | Barr ............ H10F 19/807 |
| 2019/0177219 | A1* | 6/2019 | Karam ............ C03C 27/10 |
| 2019/0345754 | A1* | 11/2019 | Singel ............ E06B 3/6715 |
| 2020/0362619 | A1* | 11/2020 | Shimizu ............ E06B 3/6612 |
| 2021/0215990 | A1* | 7/2021 | Parker ............ G02F 1/155 |
| 2021/0254395 | A1* | 8/2021 | Nielsen ............ E06B 3/6612 |
| 2021/0262279 | A1 | 8/2021 | Hedeby et al. |
| 2021/0270084 | A1 | 9/2021 | Abe et al. |
| 2021/0300822 | A1* | 9/2021 | Uriu ............ E06B 3/66 |
| 2022/0025697 | A1 | 1/2022 | Nielsen |
| 2022/0074258 | A1 | 3/2022 | Andersen et al. |
| 2022/0235601 | A1 | 7/2022 | Krisko et al. |

OTHER PUBLICATIONS

PCT Written OEinion dated Mar. 22, 2024 for PCT/US2023/079984.

Modeling of Vacuum Insulating Glazing, Published by Ashrae; by Hart et al.; 7pgs. (Dec. 2013).

Laser Assisted Frit Sealing for High Thermal Expansion Glasses; *JLMN—Journal of Laser Micro/Nanoengineering* vol. 7, No. 3, 2012, by Logunov et al.; 8 pgs (Dec. 2012).

Vacuum Insulated Glazing under the Influence of a Thermal Load; 2 pgs; by Aronen et al. (Jul. 2020).

Edge Conduction in Vacuum Glazing; Presented at Thermal Performance of the ExteriorBuildings VI, Clearwater Beach, FL, Dec. 4-8, 1995, by Simko et al.; 14pgs (Dec. 1995).

U.S. Appl. No. 18/376,897, filed Oct. 5, 2023.
U.S. Appl. No. 18/376,473, filed Oct. 4, 2023.
U.S. Appl. No. 18/376,900, filed Oct. 5, 2023.
U.S. Appl. No. 18/376,907, filed Oct. 5, 2023.
U.S. Appl. No. 18/376,479, filed Oct. 4, 2023.
U.S. Appl. No. 18/376,483, filed Oct. 4, 2023.
U.S. Appl. No. 18/376,490, filed Oct. 4, 2023.
U.S. Appl. No. 18/376,495, filed Oct. 4, 2023.
U.S. Appl. No. 18/376,926, filed Oct. 5, 2023.
U.S. Appl. No. 18/376,914, filed Oct. 5, 2023.
U.S. Appl. No. 18/376,503, filed Oct. 4, 2023.
U.S. Appl. No. 18/379,275, filed Oct. 12, 2023.
U.S. Appl. No. 18/379,285, filed Oct. 12, 2023.
U.S. Appl. No. 18/376,932, filed Oct. 5, 2023.
U.S. Appl. No. 18/377,328, filed Oct. 6, 2023.
U.S. Appl. No. 18/377,335, filed Oct. 6, 2023.
U.S. Appl. No. 18/517,044, filed Nov. 22, 2023.
U.S. Appl. No. 18/513,944, filed Nov. 20, 2023.
U.S. Appl. No. 18/510,777, filed Nov. 16, 2023.
U.S. Appl. No. 18/616,420, filed Mar. 26, 2024.
U.S. Appl. No. 18/636,472, filed Apr. 16, 2024.
U.S. Appl. No. 18/632,364, filed Apr. 11, 2024.
U.S. Appl. No. 18/617,736, filed Mar. 27, 2024.
U.S. Appl. No. 18/619,266, filed Mar. 28, 2024.
U.S. Appl. No. 18/623,109, filed Apr. 1, 2024.
U.S. Appl. No. 18/626,359, filed Apr. 4, 2024.
U.S. Appl. No. 18/633,733, filed Apr. 12, 2024.
U.S. Appl. No. 18/629,996, filed Apr. 9, 2024.
U.S. Appl. No. 18/650,204, filed Apr. 30, 2024.
U.S. Appl. No. 18/654,040, filed May 3, 2024.
U.S. Appl. No. 18/664,462, filed May 15, 2024.
U.S. Appl. No. 18/668,374, filed May 20, 2024.

* cited by examiner

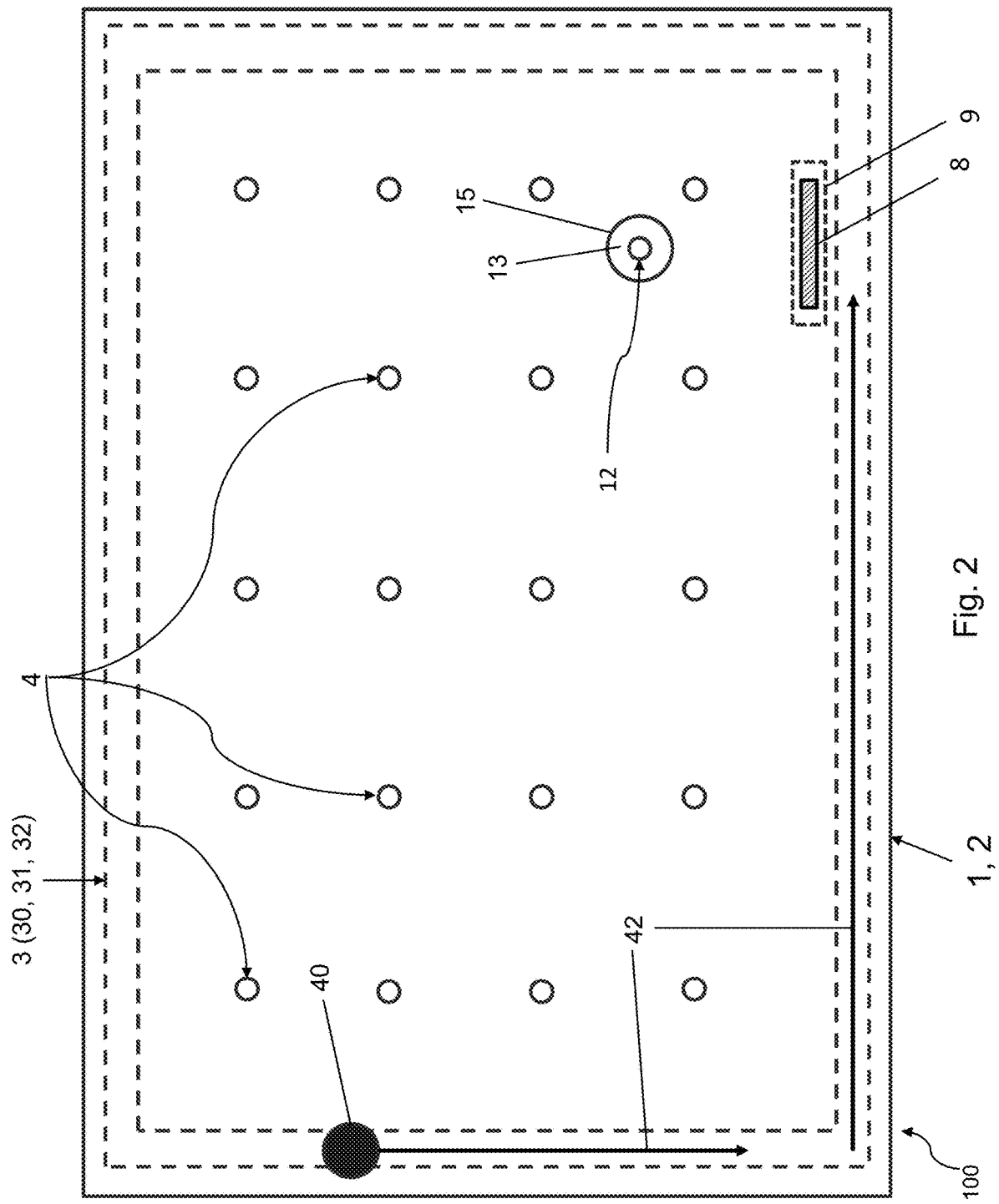

VACUUM INSULATED PANEL WITH PASSIVATION LAYER

CROSS-REFERENCE TO RELATED APPLICATIONS

This application is related to and claims priority on U.S. Provisional Application No. 63/540,729, filed Sep. 27, 2023, the disclosure of which is hereby incorporated herein by reference in its entirety for all purposes. This application is also related to and claims priority on U.S. Provisional Application No. 63/427,645, filed Nov. 23, 2022, to U.S. Provisional Application No. 63/427,657, filed Nov. 23, 2022, to U.S. Provisional Application No. 63/427,661, filed Nov. 23, 2022, and to U.S. Provisional Application No. 63/427,667, filed Nov. 23, 2022.

FIELD

Certain example embodiments are generally related to vacuum insulated devices such as vacuum insulating panels that may be used for windows or the like, and/or methods of making same.

BACKGROUND AND SUMMARY

Vacuum insulated panels are known in the art. For example, and without limitation, vacuum insulating panels are disclosed in U.S. Pat. Nos. 5,124,185, 5,657,607, 5,664,395, 7,045,181, 7,115,308, 8,821,999, 10,153,389, and 11,124,450, the disclosures of which are all hereby incorporated herein by reference in their entireties.

As discussed and/or shown in one or more of the above patent documents, a vacuum insulating panel typically includes an outboard substrate, an inboard substrate, a hermetic edge seal, a sorption getter, a pump-out port, and spacers (e.g., pillars) sandwiched between at least the two substrates. The gap between the substrates may be at a pressure less than atmospheric pressure to provide insulating properties. Providing a vacuum in the space between the substrates reduces conduction and convection heat transport, and thus provides insulating properties. For example, a vacuum insulating panel provides thermal insulation resistance by reducing convective energy between the two substrates, reducing conductive energy between the two transparent substrates, and reducing radiative energy with a low-emissivity (low-E) coating provided on one of the substrates. Vacuum insulating panels may be used in window applications (e.g., for commercial and/or residential windows), and/or for other applications such as commercial refrigeration and consumer appliance applications.

Vacuum insulated glass perimeter sealing glass systems and associated sintering and/or firing processes have shown it is possible to create a hermetically sealed vacuum device. However, vacuum insulated panels suffer from loss of vacuum level over time. This loss of vacuum over time may be caused by factors including: (a) trapped contaminants or gasses in the low pressure space from closure of the evacuation port; (b) lack of any sorption getter in the low pressure space; (c) thermal induced outgassing in the low pressure space/cavity; and/or (4) UV exposure induced outgassing in the low pressure space/gap/cavity.

UV induced outgassing in the low pressure space/gap/cavity, after the panel has been made, is a large contributor to loss of vacuum level in the low pressure space/gap/cavity. For example, UV light over the spectral range of 330 nm to 450 nm can solarize soda lime silicate float glass and cause embedded water vapor, excess hydrogen and carbon dioxide and carbon monoxide to outgas from the glass surface or bulk material. In addition, elevated ambient cavity temperature can cause embedded water vapor, hydrogen, carbon dioxide and carbon monoxide to outgas from the glass surface or bulk material, and when combined with UV light over the defined spectral range can accelerate outgassing from the glass. As the soda lime glass outgasses the getter sorbs the released gasses and will eventually become passivated with hydrogen, oxygen, carbon dioxide or carbon monoxide. Once the getter reaches full sorption capacity, any released contaminants will degrade the vacuum quality which reduces the u-factor and/or insulation factor of the vacuum insulated panel. Once the space/gap/cavity vacuum level rises too much (e.g., above 1E-4 torr), the u-factor of the vacuum insulated panel will degrade as the getter has reached its sorption capacity.

A need exists for a vacuum insulated panel that reduces UV induced, elevated temperature induced, and/or UV coupled with elevated temperature induced outgassing from glass to enable vacuum insulation panels to achieve a longer lifespan (e.g., 20 to 30 year useful life) and maintain desirable u-factor (e.g., u-factor no greater than about 0.45 $W/m^2K$) so that u-factor does not drop too much over time.

In certain example embodiments, there may be provided a vacuum insulating panel which may comprise: a first glass substrate; a second glass substrate; a plurality of spacers provided in a gap between at least the first and second substrates, wherein the gap is at pressure less than atmospheric pressure; a seal provided at least partially between at least the first and second substrates; a substantially transparent dielectric passivation layer directly on and contacting the first glass substrate; a low-emissivity (low-E) coating on the second glass substrate, so that the gap at pressure less than atmospheric pressure is provided between at least the dielectric passivation layer and the low-E coating; wherein the dielectric passivation layer on the first glass substrate, and the low-E coating on the second glass substrate, may each comprise a major surface facing the gap and exposed to the gap; wherein the dielectric passivation layer on the first glass substrate, and the low-E coating on the second glass substrate, may at least partially overlap each other; and wherein in certain example embodiments there is no low-E coating provided on the first glass substrate.

In certain example embodiments, there may be provided a vacuum insulating panel which may comprise: a first glass substrate; a second glass substrate; a plurality of spacers provided in a gap between at least the first and second substrates, wherein the gap is at pressure less than atmospheric pressure; a seal provided at least partially between at least the first and second substrates; a dielectric passivation layer on the first glass substrate and facing the gap; and wherein the dielectric passivation layer may have a refractive index (n) no greater than a refractive index (n) of the first glass substrate.

In certain example embodiments, there may be provided a vacuum insulating panel which may comprise: a first glass substrate; a second glass substrate; plurality of spacers provided in a gap between at least the first and second substrates, wherein the gap is at pressure less than atmospheric pressure; a seal provided at least partially between at least the first and second substrates; a dielectric passivation layer on the first glass substrate and facing the gap; and wherein the dielectric passivation layer may have a refractive index (n), at 550 nm, of no greater than 1.75, may cover at least about 85% of a major surface of the first glass substrate, and in certain example embodiments does not decrease visible transmission of the vacuum insulating panel by more than 3% compared to if the passivation layer was not present.

Technical advantage(s), for example, include one or more of: (a) reducing outgassing, such as hydrogen outgassing, from a glass substrate over time such as when the panel is exposed to UV radiation and/or temperature fluctuations, to extend the useful life of the panel and/or getter; (b) reducing outgassing from a glass substrate, to reduce vacuum level rising in the low pressure space/gap, without significantly reducing visible transmission of the vacuum insulated panel; and/or (c) reducing outgassing, such as outgassing of at least one of hydrogen, oxygen, carbon dioxide, and/or carbon monoxide, from glass into the low pressure space/gap to extend useful life of the panel and/or maintain desirable u-factors.

BRIEF DESCRIPTION OF THE DRAWINGS

These and/or other aspects, features, and/or advantages will become apparent and more readily appreciated from the following description of various example embodiments, taken in conjunction with the accompanying drawings. Thicknesses of layers/elements, and sizes of components/elements, are not necessarily drawn to scale or in actual proportion to one another, but rather are shown as example representations. Like reference numerals may refer to like parts throughout the several views. Each embodiment herein may be used in combination with any other embodiment(s) described herein.

FIG. 2 is a schematic top view of a vacuum insulating unit/panel according to an example embodiment (including a top view of the panel of FIG. 1), showing a laser used in forming the edge seal during manufacturing, which may be used in combination with any embodiment herein.

DETAILED DESCRIPTION

Figure 1:
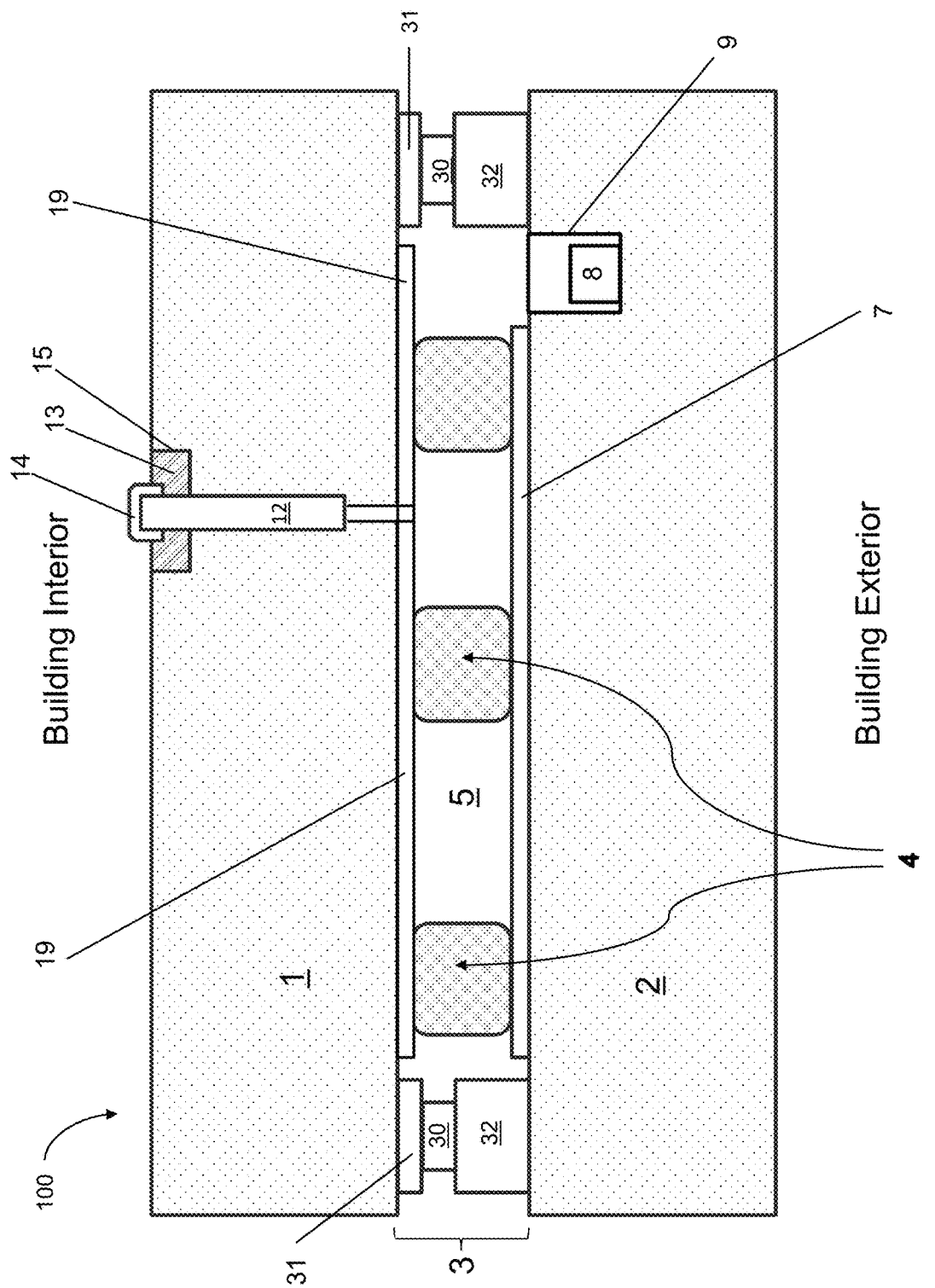
FIG. 1 is a side cross sectional view of a vacuum insulating unit/panel according to an example embodiment.

The following detailed structural and/or functional description(s) is/are provided as examples only, and various alterations and modifications may be made. The example embodiments herein do not limit the disclosure and should be understood to include all changes, equivalents, and replacements within ideas and the technical scope herein. Hereinafter, certain examples will be described in detail with reference to the accompanying drawings. When describing various example embodiments with reference to the accompanying drawings, like reference numerals may refer to like components and a repeated description related thereto may be omitted.

FIG. 1 is a side cross sectional view illustrating a vacuum insulating panel 100 according to various example embodiments, and FIG. 2 is a schematic top view of an example vacuum insulating unit/panel 100 (e.g., the panel of FIG. 1) showing a laser used in sintering/firing the main seal layer 30 when forming the edge seal 3 during manufacturing (which may be used in combination with any embodiment herein). FIG. 1 illustrates an embodiment where the edge seal 3 is spaced inwardly from the absolute edge of the panel 100, the width of the main seal layer 30 is less than a width(s) of the primer layers 31 and 32, and a thickness of the main seal layer 30 is greater than a thickness of primer seal layer 31 but less than a thickness of the other primer seal layer 32. However, one or more of these features can be changed in various example embodiments. FIG. 2 is a top view illustrating the laser beam 40 proceeding around the entire periphery of the panel along path 42 over the edge seal layers 30-32 to fire/sinter the main edge seal layer 30 in forming the hermetic edge seal 3. The laser beam 40 performs localized heating of the edge seal area, so as to not unduly heat certain other areas of the panel thereby reducing chances of significant de-tempering of the glass substrates. Each of these embodiments may be used in combination with any other embodiment described herein, in whole or in part. It should be noted that, in practice, such vacuum insulating panels/units may be oriented upside down or sideways from the orientations illustrated in FIGS. 1-2. Vacuum insulating panel 100 may be used in window applications (e.g., for commercial and/or residential windows), and/or for other applications such as commercial refrigeration and consumer appliance applications.

Referring to FIGS. 1-2, a vacuum insulating panel 100 may include a first substrate 1 (e.g., glass substrate), a second substrate 2 (e.g., glass substrate), a hermetic edge seal 3 at least partially provided proximate the edge of the panel 100, and a plurality (e.g., an array) of spacers 4 provided between at least the substrates 1 and 2 for spacing the substrates from each other and so as to help provide low-pressure space/gap 5 between at least the substrates. Each glass substrate 1, 2 may be flat, or substantially flat, possibly with non-uniform surface features from thermal heat treatment of the glass, in certain example embodiments. Support spacers 4, sometimes referred to as pillars, may be of any suitable shape (e.g., round, oval, disc-shaped, square, rectangular, rod-shaped, etc.) and may be of or include any suitable material such as stainless steel, aluminum, ceramic, solder glass, metal, and/or glass. Certain example support spacers 4 shown in the figures are substantially circular as viewed from above and substantially rectangular as viewed in cross section, and may have rounded edges. The hermetic edge seal 3 may include one or more of main seal layer 30, upper primer layer 31, and lower primer layer 32. Each "layer" herein may comprise one or more layers. At least one thermal control and/or solar control coating 7, such as a multi-layer low-emittance (low-E) coating, may be provided on at least one of the substrates 1 and 2 (e.g., see low-E coating 7 on substrate 2 in FIG. 1) in order to further improve insulating properties of the panel. The solar control coating 7 may be provided on substrate 1 or substrate 2. Passivation layer 19 may be provided on the substrate on which the low-E coating 7 is not provided. For example, in FIG. 1, the low-E coating is provided on substrate 2 whereas the passivation layer 19 is provided on substrate 1. Each substrate 1 and 2 is preferably of or including glass, but may instead be of other material such as plastic or quartz. For example, one or both glass substrates 1 and 2 may be soda-lime-silica based glass substrates, borosilicate glass substrates, lithia aluminosilicate glass substrates, or the like, and may be clear, low iron, or otherwise tinted/colored such as green, grey, bronze, or blue tinted. Substrates 1 and 2, in certain example embodiments, may each have a visible transmission of at least about 40%, more preferably of at least about 50% such as from about 50-90%, and most preferably of from about 60-90% such as from about 60-90%. The vacuum insulating panel 100, in certain example embodiments, may have a visible transmission of at least 40%, more preferably of at least 50%, and most preferably of at least 60%. The substrates 1 and 2 may be substantially parallel (parallel plus/minus ten degrees, more preferably plus/minus five degrees) to each other in certain example embodiments. Substrates 1 and 2 may or may not have the same thickness, and may or may not be of the same size and/or same material, in various example embodiments. When glass is used for substrates 1 and 2, each of the glass substrates may be from about 2-12 mm thick, more preferably from about 3-8 mm thick, and most preferably from about 4-6 mm thick. When glass is used for substrates 1 and 2, the glass may or may not be tempered (e.g., thermally tempered). Although thermally tempered glass substrates are desirable in certain environments, the glass substrate(s) may be heat strengthened. As known in the art, thermal tempering of glass typically involves heating the glass to a temperature of at least 585 degrees C., more preferably to at least 600 degrees C., more preferably to at least 620 degrees C. (e.g., to a temperature of from about 620-650 degrees C.), and then rapidly cooling the heated glass so as to compress surface regions of the glass to make it stronger. The glass substrates may be thermally tempered to increase compressive surface stress and/or central tension stress, and to impart safety glass properties including small fragmentation upon breakage. When tempered glass substrates 1 and/or 2 are used, the substrate(s) may be tempered (e.g., thermally or chemically tempered) prior to firing/sintering of main edge seal material 30 (e.g., via laser) to form the edge seal 3.

When heat strengthened glass substrates 1 and/or 2 are used, the substrate(s) may be heat strengthened prior to firing/sintering of the main edge seal material 30 (e.g., via laser) to form the edge seal 3. When a vacuum insulated glass panel/unit has one tempered glass substrate and one heat strengthened substrate, the substrate(s) may be tempered (e.g., thermally or chemically tempered) and heat strengthened prior to firing/sintering of the main edge seal material 30 (e.g., via laser) to form the edge seal 3.

When thermally tempered or heat strengthened glass substrates are used, passivation layer 19 may be deposited on the glass substrate (e.g., glass substrate 1) after the substrate has been heat strengthened or tempered. In other example embodiments, the passivation layer 19 may be deposited on the substrate prior to heat strengthening or tempering of the substrate, and thereafter the substrate may be heated to thermally temper or heat strengthen the glass substrate with the passivation layer thereon. In certain example embodiments, the dielectric passivation layer 19 may be deposited or applied to the glass surface after the glass substrate has been strengthened using thermal or chemical strengthening techniques. The glass substrate can be heat strengthened or tempered when utilizing thermal heat treatment techniques to impart thermal breakage resistance or impact resistance features. The dielectric passivation layer 19 may be deposited or applied to the glass surface when the glass is in the annealed state, and the glass substrate may then be thermally heat strengthened or tempered.

In various example embodiments, vacuum insulating panel 100 may also include at least one sorption getter 8 (e.g., at least one thin film getter) for helping to maintain the vacuum in low pressure space 5 by using reactive material for soaking up and/or bonding to gas molecules that remain in space 5 and/or which outgas from the glass substrate(s), thus providing for sorption of gas molecules in low pressure space 5. The getter 8 may be provided directly on either glass substrate 1 or 2, or may be provided on a low-E coating 7 in certain example embodiments. In certain example embodiments, the getter 8 may be laser-activated and/or activated using inductive heating techniques, and/or may be positioned in a trough/recess 9 that may be formed in the supporting substrate (e.g., substrate 2) via laser etching, laser ablating, and/or mechanical drilling.

A vacuum insulating panel 100 may also include a pump-out tube 12 used for evacuating the space 5 to a pressure(s) less than atmospheric pressure, where the elongated pump-out tube 12 may be closed/sealed after evacuation of the space 5. Pump-out seal 13 may be provided around tube 12, and a cap 14 may be provided over the top of the tube 12 after it is sealed. Tube 12 may extend part way through the substrate 1, for example part way through a double countersink hole drilled in the substrate as shown in FIGS. 1-6. However, tube 12 may extend all the way through the substrate 1 and also through the passivation layer 19, in alternative example embodiments. In certain example embodiments, the hole for the pump-out tube may extend all the way through substrate 1 (or substrate 2), and through the passivation layer 19, as shown in FIG. 1. Pump-out tube 12 may be of any suitable material, such as glass, metal, ceramic, or the like. In certain example embodiments, the pump-out tube 12 may be located on the side of the vacuum insulating panel 100 configured to face the interior of the building when the panel is used in a commercial and/or residential window. In certain example embodiments, the pump-out tube 12 may instead be located on the side of the vacuum insulating panel 100 configured to face the exterior of the building. The pump-out tube 12 may be provided in an aperture defined in either substrate 1 or 2 in various example embodiments. Pump-out seal 13 may be of any suitable material. In certain example embodiments, the pump-out seal 13 may be provided in the form of a substantially donut-shaped pre-form which may be positioned in a recess 15 formed in a surface of the substrate 1 or 2, so as to surround an upper portion of the tube 12, so that the pre-form can be laser treated/fired/sintered (e.g., after formation of the edge seal 3) to provide a seal around the pump-out tube 12. Alternatively, the pump-out seal 13 may be of any suitable material and/or may be dispensed in paste and/or liquid form to surround at least part of the tube 12 and may be sealed before and/or after evacuation of space 5. The pump-out seal material 13 may be directly applied to the glass substrate material or to a primer layer applied to the glass substrate surface prior to the pump-out seal material being applied to the substrate, in certain example embodiments. After evacuation of space 5, the tip of the tube 15 may be melted via laser to seal same, and hermetic sealing of the space 5 in the panel 100 can be provided both by the edge seal 3 and by the sealed upper portion of the pump-out tube 12 together with seal 13 and/or cap 14. In certain example embodiments, the elongated pump-out tube 12 may be substantially perpendicular (perpendicular plus/minus ten degrees, more preferably plus/minus five degrees) to the substrates 1 and 2. Any of the elements/components shown in FIGS. 1-2 may be omitted in various example embodiments.

The evacuated gap/space 5 between the substrates 1 and 2, in the vacuum insulating panel 100, is at a pressure less than atmospheric pressure. For example, after the edge seal 3 has been formed, the cavity 5 evacuated to a pressure less than atmospheric pressure, and the pump-out tube 12 closed/sealed, the gap 5 between at least the substrates 1 and 2 may be at a pressure no greater than about $1.0 \times 10^{-2}$ Torr, more preferably no greater than about $1.0 \times 10^{-3}$ Torr, more preferably no greater than about $1.0 \times 10^{-6}$ Torr, and for example may be evacuated to a pressure no greater than about $1.0 \times 10^{-6}$ Torr. The gap 5 may be at least partially filled with an inert gas in various example embodiments. In certain example embodiments, the evacuated vacuum gap/space 5 may have a thickness (in a direction perpendicular to planes of the substrates 1 and 2) of from about 100-1,000 μm, more preferably from about 200-500 μm, and most preferably from about 230-350 μm. Providing a vacuum in the gap/space 5 is advantageous as it reduces conduction and convection heat transport, so as to reduce temperature fluctuations inside buildings and the like, thereby reducing energy costs and needs to heat and/or cool buildings. Thus, panels 100 can provide high levels of thermal insulation.

A passivation layer 19, of or including at least one layer, may be provided to reduce hydrogen, oxygen, carbon monoxide, carbon dioxide, and/or contaminant migration from a glass substrate 1 (e.g., soda lime silica based glass substrate, such as a clear, colored, and/or low iron glass substrate) into the low pressure vacuum space/gap/cavity 5, in order to increase vacuum lifetime as a result of thermal exposure, ultraviolet (UV) light exposure, and/or a combination thereof. In certain example embodiments, the non-low-E or non-solar control coated substrate is passivated with a thin film coating 19 of sufficient thickness to prevent or reduce migration of water vapor, hydrogen, oxygen, carbon dioxide, carbon monoxide, and/or other contaminants from the glass substrate (e.g., clear glass substrate) 1 to the low pressure vacuum insulation unit cavity/space/gap 5. For example, substrate 1 may be a clear glass substrate that has been coated or passivated with a thin film layer/coating 19 that substantially covers a major surface of the substrate 1 facing the low pressure space/gap 5. The passivation layer 19 reduces outgassing of water vapor, hydrogen, carbon dioxide, carbon monoxide and/or other contaminants, such as when the panel 100 is exposed to UV light, thermal temperature extremes and/or a combination thereof. In certain example embodiments, the passivation layer 19 may be of or include a dielectric layer having a low index of refraction (n) and a low extinction coefficient (k). For example, the passivation layer 19 may be of or include a dielectric layer of or including silicon oxide (e.g., $SiO_2$ or other suitable stoichiometry) in certain example embodiments. In other example embodiments, the passivation layer 19 may be of or include a dielectric layer of or including silicon oxynitride, silicon nitride, aluminum oxide, and/or aluminum oxynitride. In certain example embodiments, the passivation layer 19 may be of or including a coating which comprises metal oxide(s), metal nitride(s) and/or oxynitride(s). The passivation layer 19 may be deposited using any suitable coating technique, such as via physical vapor deposition, chemical vapor deposition, liquid applied deposition, electroplating, sputtering, transfer coating, atmospheric CVD, or thermal evaporation.

After being deposited, the passivation layer 19 may be edge-deleted, in that it may be removed proximate edges of the panel so that edge seal material may directly contact the glass substrate 1 in the edge deleted area. Small amounts of outgassing may occur over time in the edge deleted area. However, a significant portion of the edge deleted area may be covered with edge seal material which can also block outgassing.

Passivation layer 19, in certain example embodiments, may be substantially transparent to visible light. Passivation layer 19 may be transmissive to at least about 80% of visible light, more preferably transmissive to at least about 90% of visible light. In certain example embodiments, passivation layer 19 covers at least about 75% (more preferably at least about 85%, and more preferably at least about 90%) of the first glass substrate as viewed from above and/or below.

Passivation layer 19, which may include at least one layer and may directly contact the glass substrate 1, may have a physical thickness of from about 10 Å to 10 μm in certain example embodiments, more preferably from about 50-1,000 Å, more preferably from about 100-600 Å, more preferably from about 150-500 Å, more preferably from about 200-400 Å, which examples being about 300 Å and about 400 Å.

Passivation layer 19 may have an index of refraction (n) close to the index of refraction of the glass substrate 1 to reduce or minimize light transmission loss due to interference-based reflections, and/or a low extinction coefficient to reduce or minimize absorption of visible light. For example, glass substrate 1 may have a refractive index of about 1.50 to 1.52. In certain example embodiments, the passivation layer 19 may have an index of refraction (n), at a wavelength of 550 nm, of no greater than about 1.75, more preferably no greater than about 1.65, more preferably no greater than about 1.50. In certain example embodiments, the passivation layer 19 may have an index of refraction (n), at a wavelength of 550 nm, of from about 1.30 to 1.70, more preferably from about 1.35 to 1.60, more preferably from about 1.40 to 1.50, more preferably from about 1.44 to 1.48. In certain example embodiments, the passivation layer 19 may have a refractive index (n) no greater than, or less than, the refractive index of the glass substrate 1 which supports the passivation layer.

In certain example embodiments, the passivation layer 19 may be substantially transparent in the visible spectrum and may be designed to reduce outgassing from the glass substrate 1 to reduce vacuum level rising in the low pressure space/gap 5, without significantly reducing visible transmission of the vacuum insulated panel 100 (e.g., based on its thickness, refractive index, and/or extinction coefficient). For example, in certain example embodiments, the addition of the passivation layer 19 does not decrease the visible transmission of the vacuum insulated panel 100 by more than 3%, more preferably does not decrease the visible transmission of the vacuum insulated panel 100 by more than 2%, more preferably does not decrease the visible transmission of the vacuum insulated panel 100 by more than 1%, compared to if the passivation layer 19 was not present. In certain example embodiments, the passivation layer 19 may be designed to have an anti-reflective (AR) effect and/or increase the visible transmission of the panel 100. In certain example embodiments, the passivation layer 19 does not significantly change optical properties during or after exposure to thermal glass tempering or heat strengthening of the glass. It is noted that the other glass substrate 2 may have a low-emissivity (Low-E) and/or solar control coating 7 thereon which substantially covers the substrate surface in order to reduce outgassing from that substrate (e.g., the low-E coating 7 may have a metal oxide and/or silicon nitride based layer contacting the glass).

In certain example embodiments, passivation layer 19 is a dielectric, is not a low-E coating, does not contain any conductive layer, and/or does not contain any IR reflecting layer (e.g., does not contain an Ag or Au layer).

Advantageously, the passivation layer 19 may provide for one or more of the following technical advantages: (a) reducing outgassing, such as hydrogen outgassing, from a glass substrate 1 over time such as when the panel 100 is exposed to UV radiation and/or temperature fluctuations, to extend the useful life of the panel 100 and/or getter 8; (b) reducing outgassing from a glass substrate 1, to reduce vacuum level rising in the low pressure space/gap 5, without significantly reducing visible transmission of the vacuum insulated panel 100; and/or (c) reducing outgassing, such as outgassing of at least one of hydrogen, oxygen, carbon dioxide, and/or carbon monoxide, from glass 1 into the low pressure space/gap 5 to extend useful life of the panel 100 and/or maintain desirable u-factors.

In various example embodiments, the passivation layer/coating 19 may have sufficient physical thickness and/or density to reduce hydrogen in a $SiO_2$ rich region of a soda lime silicate glass substrate (e.g., 1 or 2) from reaching the vacuum insulation unit low pressure cavity/space/gap 5 and saturating the sorption getter 8 thereby degrading the vacuum level and quality. The passivation layer/coating 19 may reduce radical oxygen generated by UV exposure and subsequent bond cleavage from the calcium carbonate or the sodium dioxide in the glass, from reaching the low pressure gap/space 5. In certain example embodiments, the passivation layer/coating 19 may be a metal oxide comprising silicon, silicon aluminum, tin, zinc, zinc-tin, titanium, niobium, zinc aluminum or aluminum, and optionally may comprise nitrogen. The passivation layer 19, in certain example embodiments, may be substantially transparent in the visible spectrum to allow visible light transmission, optical clarity and color rendering index of the vacuum insulation panel. An example passivation layer 19 is silicon oxide (e.g., $SiO_2$ and/or other suitable stoichiometry) with an index of refraction from about 1.48 to 1.52, an extinction coefficient of about 0.00 and a thickness range of from about 150-200 angstroms (Å). The silicon oxide (e.g., $SiO_2$ and/or other suitable stoichiometry) may be doped with other material(s), such as from about 0-7% aluminum and/or from about 0-0-7% nitrogen. In certain example embodiments, the passivation layer 19 substantially covers a major surface of the substrate, can be edge deleted around the perimeter of the substrate, and may be designed to not appreciably change spectral properties when exposed to thermal tempering or thermal heat strengthening temperatures over an example range of about 575 degrees C. to 700 degrees C. The change is luminance and color as defined by the Delta E of the coating, in certain example embodiments, may change less than 4 units when exposed to thermal tempering and/or heat strengthening when measured in transmission and/or reflection. In certain example embodiments, the passivation layer 19 may have a index of refraction less than 1.48 in order to provide anti-reflective (AR) properties thereby increasing the visible light transmission of the vacuum insulation panel.

In certain embodiments, the passivation layer/coating 19 may be of or include a metal nitride comprising silicon, silicon aluminum, tin, titanium, niobium or aluminum. The metal nitride passivation layer 19 may be substantially transparent in the visible spectrum to allow visible light transmission, optical clarity and/or color rendering index of the vacuum insulation panel. An example layer 19 material may be silicon nitride with an index of refraction from about 2.00 to 2.10, an extinction coefficient of about 0.00 and a thickness range of from about 100-200 Å. In certain embodiments, the passivation layer may be of or include a metal oxynitride comprising silicon, silicon aluminum, tin, titanium, niobium or aluminum, with an index of refraction ranging from about 1.60 to 1.90, an extinction coefficient of about 0.00 and a thickness range as discussed in any embodiment herein. In various example embodiments, the passivation layer 19 may comprise one or more layers of materials that can be any combination of metal oxide layers, metal nitride layers or metal oxynitride layers. The passivation layer 19 may have a thickness range between about 10 angstroms and 10,000 Å.

In various example embodiments, the passivation layer 19 comprising one or more layers of materials can be deposited with a stoichiometry that has a higher degree of metallic structure that becomes more oxidized or nitrided. The sub-stoichiometric layer(s) when exposed to thermal tempering or heat strengthening may change redox states and become more transparent due to a lower index of refraction and lower extinction coefficient. This baking out process may result in a passivation layer/coating 19 with reduced compressive and tensile stress thereby reducing passivation coating adhesion failures and a higher allowable thickness thereby improving the encapsulation of the glass substrate and reducing contaminant migration to the low pressure space/gap 5. For example, consider a passivation layer/coating 19 of about 200 angstroms of silicon oxynitride with an index of refraction between about 1.60 and 1.80 and an extinction coefficient between about 0.00 and 0.50. The as-deposited silicon oxynitride layer may be sub-stoichiometric between about 1.70 and 1.90, and the index of refraction may be reduced to 1.60 and 1.80 after exposure to significant heating during thermal tempering, heat strengthening or heat treatment in the range between about 550 degrees C. and 750 degrees C.

In various example embodiments, the passivation layer/coating 19 may be deposited onto the glass substrate (1 or 2) using one of the following but not limited deposition methods: physical vapor deposition, chemical vapor deposition, plasma enhanced chemical vapor deposition, pyrolytic chemical vapor deposition, atmospheric chemical vapor deposition, flame pyrolysis chemical vapor deposition, thermal evaporation, cathodic arc, liquid applied thermally cured coatings, liquid applied UV cured coatings, and atomic layer deposition.

Example low-emittance (low-E) coatings 7 which may be used in the vacuum insulating panel 100 are described in U.S. Pat. Nos. 5,935,702, 6,042,934, 6,322,881, 7,314,668, 7,342,716, 7,632,571, 7,858,193, 7,910,229, 8,951,617, 9,215,760, and 10,759,693, the disclosures of which are all hereby incorporated herein by reference in their entireties. Other low-E coatings may also, or instead, be used. A low-E coating 7 typically includes at least one IR reflecting layer (e.g., of or including silver, gold, or the like) sandwiched between at least first and second dielectric layer(s) of or including materials such as silicon nitride, zinc oxide, tin oxide, zinc stannate, and/or the like. A low-E coating 7 may have one or more of: (i) a hemispherical emissivity/emittance of no greater than about 0.20, more preferably no greater than about 0.04, more preferably no greater than about 0.028, and most preferably no greater than about 0.015, and/or (ii) a sheet resistance ($R_s$) of no greater than about 15 ohms/square, more preferably no greater than about 2 ohms/square, and most preferably no greater than about 0.7 ohms/square, so as to provide for solar control. In certain example embodiments, the low-E coating 7 may be provided on the interior surface of the glass substrate to be closest to the building exterior, which is considered surface two, whereas in other example embodiments the low-E coating 7 may be provided on the interior surface of the glass substrate to be closest to the building interior, which is considered surface three.

In certain example embodiments, the low-E coating 7 and the passivation layer 19 are provided on opposite substrates as shown in FIG. 1. Passivation layer 19 can be provided on glass substrate 1 and low-E coating 7 can be provided on glass substrate 2, as shown in FIG. 1. Alternatively, passivation layer 19 can be provided on glass substrate 2 and low-E coating 7 can be provided on glass substrate 1.

Edge seal 3, which may include one or more of ceramic layers 30-32, may be located proximate the periphery or edge of the vacuum insulated panel 100 as shown in FIGS. 1-2. Edge seal 3 may be a ceramic edge seal in certain example embodiments. Layer 30 of the edge seal may be considered a main or primary seal layer, and layers 31 and 32 may be considered primer layers. One or more of seal layers 30-32, of the edge seal 3, may be of or include ceramic frit in certain example embodiments, and/or may be lead-free or substantially lead-free (e.g., no more than about 15 ppm Pb, more preferably no more than about 5 ppm Pb, even more preferably no more than about 2 ppm Pb) in certain example embodiments. In certain example embodiments, each primer layer 31 and 32 may be of a material having a coefficient of thermal expansion (CTE) that is between that of the main seal layer 30 and the closest glass substrate 1, 2. A primer(s) 31 and/or 32 may be omitted in certain example embodiments. In certain example embodiments, primer layers 31 and 32 may be of or include different material(s) compared to the main seal layer 30. In certain example embodiments, main seal layer 30 and primers 31 and 32 can be sintered/fired in different heating steps, in a manner which allows thermal tempering of the glass substrates 1 and 2 when sintering/heating the primers on the respective glass substrates, and which allows the main seal layer 30 to thereafter be sintered and bonded to the primers 31 and 32 without significantly de-tempering the glass substrates 1 and 2. This may advantageously result in more efficient processing, reduction in damage (e.g., micro-cracking, adhesive failure, cohesive failure, and/or significant de-tempering), and a more durable and longer lasting vacuum insulating panel with much of its temper strength retained allowing for example compliance with industry safety testing for bag impact and/or point impact fragmentation.

Example materials, dimensions, and characteristics of the edge seal 3, which may include one or more of layers 30-32, the getter 8, the pump-out tube and corresponding seal, and example manufacturing techniques for the panel 100, may be found in U.S. Provisional Application No. 63/540,729, filed Sep. 27, 2023, the disclosure of which is hereby incorporated herein by reference in its entirety.

The edge seal 3, in certain example embodiments, may be located at an edge-deleted area (where the solar control coating 7 and/or passivation layer 19 has/have been removed) of the substrate as shown in FIG. 1, so as to reduce chances of corrosion and to allow the seal to directly contact the glass substrates. Thus, the edge seal 3 may be positioned so that it does not overlap the low-E coating 7 and/or passivation layer 19 in certain example embodiments. The edge seal 3 may be located at the absolute edge of the panel 100, or may be spaced inwardly from the absolute edge of the panel 100 as shown in FIGS. 1-2, in different example embodiments. An outer edge of the hermetic edge seal 3 may be located within about 50 mm, more preferably within about 25 mm, and more preferably within about 15 mm, of an outer edge of at least one of the substrates 1 and/or 2. Thus, an "edge" seal does not necessarily mean that the edge seal 3 is located at the absolute edge or absolute periphery of a substrate(s) or overall panel 100.

The low-E coating 7 may be edge deleted around the periphery of the entire unit so as to remove the low-e coating material from the coated glass substrate. The same applies to the passivation layer 19. The low-E coating 7 and/or passivation layer 19 edge deletion width (edge of glass to edge of low-E coating 7), in certain example embodiments, in at least one area may be from about 0-100 mm, with examples being no greater than about 6 mm, no greater than about 10 mm, no greater than about 13 mm, no greater than about 25 mm, with an example being about 16 mm. In certain example embodiments, there may be a gap between the primer seal layers 31 and 32 and/or main layer 30, and the low-E coating 7 and/or passivation layer 19, of at least about 1.0 mm, and/or of at least about 0.5 mm, so that the low-E coating 7 and/or passivation layer 19 is not contiguous with the main seal layer 30 and/or the primer seal layers 31 and 32.

In certain example embodiments, in the manufactured vacuum insulating panel 100, the main seal layer 30 of the edge seal 3 may have an average thickness of from about 30-180 µm, more preferably from about 30-120 µm, more preferably from about 40-100 µm, and most preferably from about 50-85 µm. In certain example embodiments, in the manufactured vacuum insulating panel 100, the primer layer 31 of the edge seal 3 may have an average thickness of from about 10-100 µm, more preferably from about 10-80 µm, more preferably from about 20-70 µm, and most preferably from about 20-55 µm, with an example primer layer 31 average thickness being about 45 µm. In certain example embodiments, in the manufactured vacuum insulating panel 100, the primer layer 32 (opposite the side from which the laser beam 40 is directed) of the edge seal 3 may have an average thickness of from about 80-240 µm, more preferably from about 100-220 µm, more preferably from about 120-200 µm, and most preferably from about 120-170 µm, with an example primer layer 32 average thickness being about 145 µm. In certain example embodiments, the thickness of the main seal layer 30 may be at least about 30 µm thinner (more preferably at least about 45 µm thinner) than the thickness of the primer seal layer 32, and may be at least about 10 µm thicker (more preferably at least about 20 µm, and more preferably at least about 30 µm thicker) than the thickness of the primer seal layer 31. In certain example embodiments, in the manufactured vacuum insulating panel 100, the overall average thickness of the edge seal 3 may be from about 150-330 µm, more preferably from about 200-310 µm, and most preferably from about 220-290 µm, with an example overall edge seal 3 average thickness being about 270 µm. In certain example embodiments, the respective thicknesses of each layer 30, 31, and 32 may be substantially the same (the same plus/minus 10%, more preferably plus/minus 5%) along the length of the edge seal 3 around the periphery of the entire panel 100.

U.S. Provisional Application No. 63/540,729, filed Sep. 27, 2023, discloses example material(s) that may be used for the main seal layer 30 in various example embodiments. However, other suitable materials (vanadium oxide based ceramic materials with little or no Te oxide, solder glass, or the like) may instead be used for seal layer 30 in various example embodiments. For example, main seal layer 30 may be of or include a ceramic tellurium (Te) oxide based main seal material in certain example embodiments, which may also include vanadium oxide. Table 1, for example, illustrates example ranges for various example elements and/or compounds for an example tellurium oxide-based material for main seal layer 30 according to various example embodiments, for both mol % and weight %, after firing/sintering thereof and thus after hermetic edge seal 3 formation. It will be appreciated that other materials may be used together, or in place of, those shown below, and that the example percentages may be different in alternate embodiments.

TABLE 1

(example material for main seal layer 30 after laser firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Tellurium oxide (e.g., $TeO_3$ and/or other stoichiometry) | 20-60% or 40-90% | 38-70% | 50-60% | 20-80% | 40-70% | 50-65% |
| Vanadium oxide (e.g., $VO_2$ and/or other stoichiometry) | 5-45% or 5-58% | 8-30% or 5-37% | 20-25% | 10-50% | 12-40% | 25-30% |
| Aluminum oxide (e.g., $Al_2O_3$ and/or other stoichiometry) | 0-45% or 1-25% | 5-30% or 6-25% | 8-20% | 0-45% | 3-30% | 5-15% |
| Silicon oxide (e.g., $SiO_2$ and/or other stoichiometry) | 0-50% or 0-5% | 3-30% | 5-20% | 0-50% | 1-25% | 1-10% |
| Magnesium oxide (e.g., MgO and/or other stoichiometry) | 0-50% or 0-10% | 0.1-20% | 0.5-5% | 0-50% | 0.1-12% | 0.2-5% |
| Barium oxide (e.g., BaO and/or other stoichiometry) | 0-20% | 0-10% | 0-5% | 0-20% | 0-10% | 0-5% |
| Manganese oxide (e.g., MnO and/or other stoichiometry) | 0-20% | 0-10% | 0.50-5% | 0-20% | 0-10% | 0.50-5% |

In certain example embodiments, the material for the main seal layer 30 may include filler. The amount of filler may, for example, be from 1-25 wt. % and may have an average grain size (d50) of 5-30 µm, for example an average d50 grain size from about 5-20 µm, more preferably from about 5-15 µm, and most preferably less than about 10 µm. Mixtures of two or more grain size distributions (e.g., coarse: d50=15-25 µm and fine: d50=1-10 µm) may be used. The filler may, for example, comprise one or more of zirconyl phosphates, dizirconium diorthophosphates, zirconium tungstates, zirconium vanadates, aluminum phosphate, cordierite, eucryptite, ekanite, alkaline earth zirconium phosphates such as (Mg,Ca,Ba,Sr) $Zr_4 P_5O_{24}$, either alone or in combination. Filler in a range of 20-25 wt. % may be used in layer 30 in certain example embodiments. Main seal layer 30, and/or the primer layer(s) 31 and/or 32, is/are lead-free and/or substantially lead-free in certain example embodiments.

U.S. Provisional Application No. 63/540,729, filed Sep. 27, 2023, discloses example material(s) that may be used for the primer layer(s) 31 and/or 32 in various example embodiments. However, other suitable materials, such as solder glass, other materials comprising bismuth oxide, and so forth, may be used for one or both primer layers 31 and/or 32 in various example embodiments. For example, Table 2 sets forth example ranges for various example elements and/or compounds for primer layer 31 and/or 32 material according to various example embodiments, for both mol % and weight %, after firing/sintering thereof and after hermetic edge seal 3 formation. It will be appreciated that other materials may be used together, or in place of, those shown below, and that the example percentages may be different in alternate embodiments.

TABLE 2

(example primer material after edge seal formation)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| bismuth oxide (e.g., $Bi_2O_3$ and/or other stoichiometry) | 0.5-50% | 1-12% or 1-20% | 4-9% | 5-50% or 55-95% | 20-40% or 70-80% | 20-35% or 70-80% |
| boron oxide (e.g., $B_2O3$ and/or other stoichiometry) | 20-65% | 30-60% | 40-55% | 15-70% | 25-45% | 30-40% |
| Silicon oxide (e.g., $SiO_2$ and/or other stoichiometry) | 0-50% or 0-15% | 15-35% or 5-15% | 22-30% | 0-50% | 5-35% | 15-30% |
| Titanium oxide (e.g., $TiO_2$ and/or other stoichiometry) | 0-20% | 3-12% | 4-11% | 0-20% | 3-12% | 4-11% |

Other compounds may also be provided in this primer material. Certain elements may change during firing/sintering, and certain elements may at least partially burn off during processing prior to formation of the final edges seal 3. It will be appreciated that, as with other layers discussed herein, other materials may be used together, or in place of, those shown above, and that the example weight/mol percentages may be different in alternate embodiments. The ceramic sealing glass primer materials for layer(s) 31 and/or 32 are lead-free and/or substantially lead-free in certain example embodiments.

At least one getter 8 may be provided on either glass substrate 1 or 2. The getter may or may not be provided over a low-E coating in certain example embodiments. FIGS. 1-2 illustrate that an example thin film getter, which may be laser-activated, coil-activated, or otherwise activated, may be positioned in a trough/recess 9 formed in the underlying substrate (e.g., substrate 2) via laser etching, laser ablating, and/or mechanical drilling. Getter 8 may be a Ti-based, Ti-inclusive, V-based, V-inclusive, nickel-based, and/or nickel-inclusive getter in certain example embodiments.

In certain example embodiments, a getter 8 (e.g., thin film getter, pill-type getter, disc-type getter, or any other suitable getter) may be positioned adjacent the edge seal 3 (e.g., see FIGS. 1-2). This is advantageous in that it allows the getter 8 to be at least partially hidden by a window sash (not shown) around the edge of the panel in window applications, so as to be aesthetically pleasing, and the getter 8 length can be increased to accommodate vacuum insulating panels 100 with larger vision areas. Other getter approaches, such as a pill-type or disc-type getter opposing the pump-out tube on the opposite substrate so as to hide the getter behind the evacuation port sealing material and evacuation tube, may be used in certain example embodiments. However, a thin film getter 8 may be more desirable in certain example embodiments. A thin film getter can provide increased sorption surface area, which is particularly desirable for vacuum insulating panels, e.g., to deliver a longer up to a 20-year vacuum life due to outgassing or off-gassing of contaminants in the vacuum cavity 5 due to ultraviolet light exposure and/or temperature.

In an example embodiment, there may be provided a vacuum insulating panel (e.g., 100) which may comprise: a first glass substrate (e.g., 1 or 2); a second glass substrate (e.g., the other of 1 or 2); a plurality of spacers (e.g., 4) provided in a gap (e.g., 5) between at least the first and second substrates, wherein the gap (e.g., 5) is at pressure less than atmospheric pressure; a seal (e.g., 3) provided at least partially between at least the first and second substrates; a substantially transparent dielectric passivation layer (e.g., 19) directly on and contacting the first glass substrate; a low-emissivity (low-E) coating (e.g., 7) on the second glass substrate, so that the gap (e.g., 5) at pressure less than atmospheric pressure is provided between at least the dielectric passivation layer and the low-E coating; wherein the dielectric passivation layer on the first glass substrate, and the low-E coating on the second glass substrate, may each comprise a major surface facing the gap and exposed to the gap; wherein the dielectric passivation layer (e.g., 19) on the first glass substrate, and the low-E coating (e.g., 7) on the second glass substrate, may at least partially overlap each other; and wherein in certain example embodiments there is no low-E coating provided on the first glass substrate.

In certain example embodiments, there may be provided a vacuum insulating panel (e.g., 100) which may comprise: a first glass substrate (e.g., 1 or 2); a second glass substrate (e.g., the other of 1 or 2); a plurality of spacers (e.g., 4) provided in a gap (e.g., 5) between at least the first and second substrates, wherein the gap (e.g., 5) is at pressure less than atmospheric pressure; a seal (e.g., 3) provided at least partially between at least the first and second substrates; a dielectric passivation layer (e.g., 19) on the first glass substrate and facing the gap; and wherein the dielectric passivation layer (e.g., 19) may have a refractive index (n) no greater than a refractive index (n) of the first glass substrate.

In certain example embodiments, there may be provided a vacuum insulating panel which may comprise: a first glass substrate; a second glass substrate; plurality of spacers provided in a gap between at least the first and second substrates, wherein the gap is at pressure less than atmospheric pressure; a seal provided at least partially between at least the first and second substrates; a dielectric passivation layer on the first glass substrate and facing the gap; and wherein the dielectric passivation layer may have a refractive index (n), at 550 nm, of no greater than 1.75, may cover at least about 85% of a major surface of the first glass substrate, and in certain example embodiments does not decrease visible transmission of the vacuum insulating panel by more than 3% compared to if the passivation layer was not present.

In the vacuum insulating panel of any of the preceding three paragraphs, in certain example embodiments the dielectric passivation layer does not contain any conductive layer and/or does not contain any metal based IR reflective layer.

In the vacuum insulating panel of any of the preceding four paragraphs, the passivation layer may be laterally spaced apart from the seal.

In the vacuum insulating panel of any of the preceding five paragraphs, the low-E coating may be laterally spaced apart from the seal.

In the vacuum insulating panel of any of the preceding six paragraphs, the passivation layer may consist of or consist essentially of a single layer.

In the vacuum insulating panel of any of the preceding seven paragraphs, the passivation layer may consist of or consist essentially of a single layer comprising silicon oxide (e.g., $SiO_2$), silicon oxynitride, aluminum oxide, or aluminum oxynitride.

In the vacuum insulating panel of any of the preceding eight paragraphs, the passivation layer may consist of or consist essentially of a single layer which may consist of or consist essentially of silicon oxide (e.g., $SiO_2$), silicon oxynitride, aluminum oxide, or aluminum oxynitride.

In the vacuum insulating panel of any of the preceding nine paragraphs, the passivation layer may have a refractive index (n) no greater than a refractive index (n) of the first glass substrate.

In the vacuum insulating panel of any of the preceding ten paragraphs, the passivation layer may have a refractive index (n), at 550 nm, of no greater than about 1.75, more preferably no greater than about 1.65, more preferably no greater than about 1.50.

In the vacuum insulating panel of any of the preceding eleven paragraphs, the passivation layer may have a refractive index (n), at 550 nm, of from about 1.40 to 1.50, more preferably of from about 1.44 to 1.48.

In the vacuum insulating panel of any of the preceding twelve paragraphs, the passivation layer may have an extinction coefficient of from about 0.00 to 0.50.

In the vacuum insulating panel of any of the preceding thirteen paragraphs, in certain example embodiments the passivation layer does not decrease visible transmission of the vacuum insulating panel by more than 3% (more preferably 2%, more preferably 1%, and possibly may decrease visible transmission), compared to if the passivation layer was not present.

In the vacuum insulating panel of any of the preceding fourteen paragraphs, the passivation layer may have a physical thickness of from about from about 150-500 Å, more preferably of from about from about 200-400 Å.

In the vacuum insulating panel of any of the preceding fifteen paragraphs, the passivation layer may cover at least about 75% of a major surface of the first glass substrate, more preferably may cover at least about 85% of a major surface of the first glass substrate.

In the vacuum insulating panel of any of the preceding sixteen paragraphs, the passivation layer may comprise at least one of: silicon oxide, silicon aluminum oxide, silicon oxynitride, silicon aluminum oxynitride, aluminum oxide, and aluminum oxynitride.

In the vacuum insulating panel of any of the preceding seventeen paragraphs, the passivation layer may be edge-deleted and not physically contact the seal.

In the vacuum insulating panel of any of the preceding eighteen paragraphs, the seal may comprise one, two or three seal layers for example. First and second seal layers of different material may overlap each other.

In the vacuum insulating panel of any of the preceding nineteen paragraphs, the first and second glass substrates may comprise tempered glass substrates or heat strengthened glass substrates.

In the vacuum insulating panel of any of the preceding twenty paragraphs, the seal may be a hermetic edge seal of the vacuum insulating panel.

In the vacuum insulating panel of any of the preceding twenty-one paragraphs, the panel may be configured for use in a window.

It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). Terms, such as "first", "second", and the like, may be used herein to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component. "Or" as used herein may cover both "and" and "or."

It should be noted that if it is described that one component is "connected", "coupled", or "joined" to another component, at least a third component(s) may be "connected", "coupled", and "joined" between the first and second components, although the first component may be directly connected, coupled, or joined to the second component. Thus, terms such as "connected" and "coupled" cover both direct and indirectly connections and couplings.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The word "about" as used herein means the identified value plus/minus 5%.

"On" as used herein covers both directly on, and indirectly on with intervening element(s) therebetween. Thus, for example, if element A is stated to be "on" element B, this covers element A being directly and/or indirectly on element B. Likewise, "supported by" as used herein covers both in physical contact with, and indirectly supported by with intervening element(s) therebetween.

Each embodiment herein may be used in combination with any other embodiment(s) described herein.

While the disclosure has been illustrated and described with reference to various example embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in combination with any other embodiment(s) described herein.

The invention claimed is:

1. A vacuum insulating panel comprising:
a first glass substrate;
a second glass substrate;
a plurality of spacers provided in a gap between at least the first and second substrates, wherein the gap is at pressure less than atmospheric pressure;
a ceramic seal provided at least partially between at least the first and second substrates;
a substantially transparent dielectric passivation layer directly on and contacting a first surface of the first glass substrate, wherein the passivation layer has a physical thickness of from about from about 150-500 Å;
a low-emissivity (low-E) coating on the second glass substrate, so that the gap at pressure less than atmospheric pressure is provided between at least the dielectric passivation layer and the low-E coating;
wherein the dielectric passivation layer on the first glass substrate, and the low-E coating on the second glass substrate, each comprise a major surface facing the gap and exposed to the gap;
wherein the dielectric passivation layer on the first glass substrate, and the low-E coating on the second glass substrate, at least partially overlap each other;
wherein an area of the first surface of the first glass substrate, located between the passivation layer and the ceramic seal, is not covered by the passivation layer so that the passivation layer does not contact the ceramic seal; and
wherein there is no low-E coating provided on the first glass substrate.

2. The vacuum insulating panel of claim 1, wherein the dielectric passivation layer does not contain any conductive layer and does not contain any metal based IR reflective layer.

3. The vacuum insulating panel of claim 1, wherein the passivation layer is laterally spaced apart from the seal.

4. The vacuum insulating panel of claim 1, wherein the low-E coating is laterally spaced apart from the seal.

5. The vacuum insulating panel of claim 1, wherein the passivation layer consists essentially of a single layer.

6. The vacuum insulating panel of claim 1, wherein the passivation layer consists essentially of a single layer comprising $SiO_2$.

7. The vacuum insulating panel of claim 1, wherein the passivation layer consists essentially of a single layer which consists essentially of $SiO_2$.

8. The vacuum insulating panel of claim 1, wherein the passivation layer has a refractive index (n) no greater than a refractive index (n) of the first glass substrate.

9. The vacuum insulating panel of claim 1, wherein the passivation layer has a refractive index (n), at 550 nm, of no greater than about 1.75.

10. The vacuum insulating panel of claim 1, wherein the passivation layer has a refractive index (n), at 550 nm, of no greater than about 1.65.

11. The vacuum insulating panel of claim 1, wherein the passivation layer has a refractive index (n), at 550 nm, of no greater than about 1.50.

12. The vacuum insulating panel of claim 1, wherein the passivation layer has a refractive index (n), at 550 nm, of from about 1.40 to 1.50.

13. The vacuum insulating panel of claim 1, wherein the passivation layer has a refractive index (n), at 550 nm, of from about 1.44 to 1.48.

14. The vacuum insulating panel of claim 1, wherein the passivation layer has an extinction coefficient of from about 0.00 to 0.50.

15. The vacuum insulating panel of claim 1, wherein the passivation layer does not decrease visible transmission of the vacuum insulating panel by more than 3%, compared to if the passivation layer was not present.

16. The vacuum insulating panel of claim 1, wherein the passivation layer does not decrease visible transmission of the vacuum insulating panel by more than 2%, compared to if the passivation layer was not present.

17. The vacuum insulating panel of claim 1, wherein the passivation layer has a physical thickness of from about from about 200-400 Å.

18. The vacuum insulating panel of claim 1, wherein the passivation layer covers at least about 75% of a major surface of the first glass substrate.

19. The vacuum insulating panel of claim 1, wherein the passivation layer covers at least about 85% of a major surface of the first glass substrate.

20. The vacuum insulating panel of claim 1, wherein the passivation layer comprises at least one of: silicon oxide, silicon aluminum oxide, silicon oxynitride, silicon aluminum oxynitride, aluminum oxide, and aluminum oxynitride.

21. The vacuum insulating panel of claim 1, wherein the passivation layer is edge-deleted and does not physically contact the seal.

22. The vacuum insulating panel of claim 1, wherein the passivation layer is configured to block at least hydrogen outgassing from the first glass substrate upon exposure to UV radiation and/or temperature fluctuations.

23. The vacuum insulating panel of claim 1, wherein the seal comprises first and second seal layers of different material which overlap each other.

24. The vacuum insulating panel of claim 23, wherein the seal further comprises a third seal layer.

25. The vacuum insulating panel of claim 1, wherein the first and second glass substrates comprise tempered glass substrates or heat strengthened glass substrates.

26. The vacuum insulating panel of claim 1, wherein the seal is a hermetic edge seal of the vacuum insulating panel.

27. The vacuum insulating panel of claim 1, wherein the panel is configured for use in a window.

28. A vacuum insulating panel comprising:
a first glass substrate;
a second glass substrate;
a plurality of spacers provided in a gap between at least the first and second substrates, wherein the gap is at pressure less than atmospheric pressure;
a ceramic seal provided at least partially between at least the first and second substrates;
a substantially transparent dielectric passivation layer directly on and contacting a first surface of the first glass substrate;
a low-emissivity (low-E) coating on the second glass substrate, so that the gap at pressure less than atmospheric pressure is provided between at least the dielectric passivation layer and the low-E coating;
wherein the dielectric passivation layer on the first glass substrate, and the low-E coating on the second glass substrate, each comprise a major surface facing the gap and exposed to the gap;
wherein the dielectric passivation layer on the first glass substrate, and the low-E coating on the second glass substrate, at least partially overlap each other;
wherein an area of the first surface of the first glass substrate, located between the passivation layer and the ceramic seal, is not covered by the passivation layer so that the passivation layer does not contact the ceramic seal;
wherein there is no low-E coating provided on the first glass substrate; and
wherein the passivation layer consists essentially of a single layer comprising $SiO_2$.

* * * * *